Sept. 15, 1970  J. T. TAYLOR  3,528,903
LIQUID JUNCTION STRUCTURE
Filed Jan. 24, 1968

INVENTOR.
JOHN T. TAYLOR
BY JOSEPH H. GOLANT
ATTORNEY

United States Patent Office 3,528,903
Patented Sept. 15, 1970

3,528,903
LIQUID JUNCTION STRUCTURE
John T. Taylor, Orange, Calif., assignor to Beckman Instruments, Inc., a corporation of California
Filed Jan. 24, 1968, Ser. No. 700,082
Int. Cl. G01n 27/30, 27/40
U.S. Cl. 204—195          4 Claims

ABSTRACT OF THE DISCLOSURE

The disclosure describes a liquid junction structure for a reference electrode or the like having a plug composed of a plurality of filaments joined at one end by fusion, cement or hardened glass depending upon the plug material.

BACKGROUND OF THE INVENTION

Field of the invention

This invention relates generally to a liquid junction structure and in particular to a liquid junction structure for a salt bridge tube such as is used in reference electrodes for ion potential measurements in solutions.

Description of the prior art

In electrochemical measurements a reference electrode is commonly employed in conjunction with a measuring electrode, such as a glass electrode, with both electrodes immersed in a solution, whereby the potential difference between two electrodes is a function of the concentration of a specific ion in the solution. A typical example is the conventional pH meter and electrode pair used for measuring hydrogen ion concentration in solutions.

A reference electrode ordinarily comprises an internal half cell structure supported within a tube containing a salt solution, the salt solution being known as a salt bridge. Electrical connection between the salt solution and the sample or test solution is made by liquid contact via a suitably formed partially plugged opening or passage in the tube generally referred to as a liquid junction structure. Sometimes the entire unit consisting of the internal half cell structure, the tube, the salt solution and the liquid junction structure is referred to as a half cell; however, for the present specification the entire unit will be referred to as a reference electrode.

Various junction materials have been used to control a small liquid flow through the liquid junction structure. Filament type plugs, made of such material as asbestos fibers or quartz yarn are well known in the art. Problems, however, have arisen when such junction materials are used under pressure. Often it is necessary to apply a pressure within the reference electrode tube when the reference electrode is immersed in a sample solution which may tend to clog the junction material and prevent the flow of the salt bridge solution. At about 30 p.s.i. asbestos fibers were found to blow out or flow out with the salt bridge solution into the sample solution. This was especially true of the inner fibers of a circular cross section plug. Since the purpose of a liquid junction structure is to allow a minimum flow of salt bridge solution (consistent with the proper functioning of the reference electrode) through the spaces between the plurality of fibers or filaments, having individual fibers or filaments blowing out causes a greater spacing and thereby an undesired greater flow of salt bridge solution. Such an increased flow may contaminate the sample solution introducing error into the measurement as well as necessitate frequent refilling of the salt solution, the latter being an intolerable burden in some circumstances.

OBJECTS

An object of the present invention is to provide a liquid junction structure for a salt bridge tube that is simply constructed and inexpensive to manufacture, requiring a minimum amount of skill for production.

Another object of the invention is to provide a liquid junction structure having a junction material which will not blow out when operated under pressure, but yet will provide a minimum predetermined flow of salt solution.

Other objects and many of the attendant advantages of this invention will become more readily apparent to those skilled in the art as the same becomes better understood by reference to the following detailed description of preferred embodiments of the invention when read in connection with the accompanying sheet of drawings.

DESCRIPTION OF THE PREFERRED EMBODIMENTS

Figure 1:
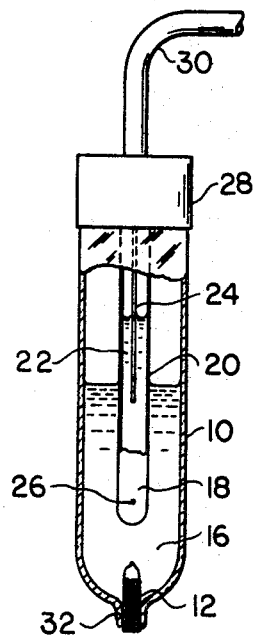
FIG. 1 is a side view, partly in section, showing a reference electrode incorporating the liquid junction structure of the invention.

Referring now to the drawing wherein like reference numerals designate like or corresponding parts throughout the several views, there is illustrated in FIG. 1 a side view of a reference electrode comprising a tube 10 of a nonconductive material which is constricted at its lower end and having a plug 12 sealed therein. The tube contains a salt solution 16 forming a salt bridge with an internal half cell 18 positioned within the tube and partially immersed in the salt solution. The internal half cell may be a silver-silver chloride half cell which may comprise a second tube 20 containing a solution 22 of potassium chloride saturated silver chloride and a silver wire 24 coated with silver chloride. The wire 24 is partially immersed in the solution 22. It is understood that any other convenient internal half cell may be used. A small opening 26 is provided in the tube 20 for liquid communication with the solution 16. The electrode structure is closed at its upper end with a cap 28. The cap may support a cable 30 providing electrical connection between the wire 24 and a pH meter (not shown) which operates in a fashion well known in the art.

There is an opening 32 in the lower end of the tube 10 through which the salt solution passes so as to communicate the internal half cell 18 with a sample solution about the tube 10. Sealed within the opening 32 is the plug 12 for the purpose of keeping the salt solution flow to a minimum consistent with the proper operation of the reference electrode.

Figure 2:
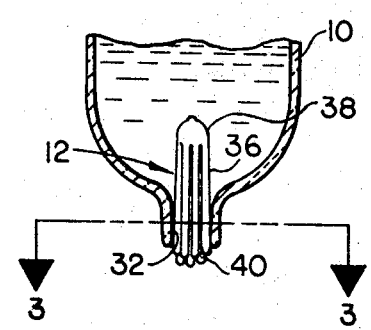
FIG. 2 is an enlarged view of a portion of FIG. 1 illustrating in more detail the liquid junction structure.

Referring now to FIG. 2 which illustrates the liquid junction structure in greater detail the plug 12 comprises a plurality of filaments 36, each filament having a first or joined end 38 and a second or loose end 40. The filaments are joined together at their ends 38. The joining may be by fusing the filament ends or by dipping the ends of the filament into molten glass whereupon the cooling glass adheres to the individual filaments if the junction material is quartz yarn, or the joining may be by bonding with a suitable cement or other bonding agent if the material is asbestos fibers. Any suitable joining means may be used depending upon the junction material, provided the joining means does not contaminate the salt bridge solution or interfere with the operation of the reference electrode in any other fashion. The joined filaments are partially disposed within the opening 32 so that the joined ends 38 are spaced inwardly from the wall of the tube 10 while the loose ends 40 extend outwardly slightly beyond the opening 32.

With an opening having a diameter of about .015 inch, the joined ends of the filaments may be spaced about .08 inch from the tube wall; it is desirable to have the joined ends spaced from the tube wall and the opening 32 so that the joined ends do not situate themselves within the opening and completely restrict the flow of solution; that is, there will be enough space available for the salt solution to pass under the joined ends and into the plurality of filaments so as to slowly leak to the loose ends of the filament outside the tube. If the joined ends are spaced too far from the tube wall, they become top heavy and tip over or they will collapse the filaments; in either circumstance the flow of salt solution may be disrupted. It is desirable for the loose ends to extend slightly beyond the opening for added structural integrity, to prevent the filaments from deforming and to prevent the tube from closing the opening when it is heated.

Figure 3:
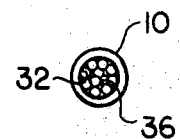
FIG. 3 is a section view taken along line 3—3 of FIG. 2.

After the joined ends of the filaments are secured together and inserted into the opening 32 of the tube 10, the area adjacent the opening is heated to a fluid condition with the tube material flowing about the filaments confining them in the opening 32 as seen in FIG. 3.

By way of example, a commercially available quartz yarn has been utilized as the plurality of filaments. The yarn comprises about one hundred and eighty continuous fibers with the diameter of each fiber being approximately 0.0004 inch. The quartz yarn is preferably washed in a concentrated sulphuric acid solution to rid the yarn of sizing. The salt bridge tube may be constructed of lead glass, a nonconductive material such as Corning 0010 or 0120 glass. The quartz yarn is placed on a flat surface with the ends to be joined heated by an oxy-hydrogen flame to a temperature of about 2600° C. The heat fuses the ends of the quartz yarn and upon cooling a semi-ball like structure is formed as shown in FIG. 2. The joined quartz yarn is then inserted with tweezers into the opening 32 of the tube 10 so that the fused end 38 is approximately .08 inch from the inside surface of the glass tube. The tube wall about the opening is then heated to approximately 900° C. placing the wall in a fluid condition. Since the quartz yarn has a much higher melting temperature than the glass tube the 900° C. will not melt the quartz yarn. The glass flows about the yarn to confine the yarn in the opening so that upon cooling the yarn is set in a fixed position.

Alternatively, the ends of the filaments may be secured together by dipping into a container of molten glass, keeping the yarn in contact with the molten glass for a sufficient time for the yarn to be heated to the temperature of the molten glass, usually a few seconds, so that air bubbles do not develop in the joined portion, and then cooling the joined ends to room temperature to harden the glass. The molten glass may be any glass having a melting point lower than that of the filaments which are being used, and having sufficiently low viscosity so that the filaments can be easily dipped without being bent or deformed by the molten glass. Many glasses will fit the above requirements for a binder with convenient temperatures being chosen dependent upon the glass being used; the choice of the proper glass and temperature is well known by those skilled in the glass art.

Although several embodiments of the invention have been disclosed herein for purposes of illustration, it will be understood that various changes can be made in the form, details, arrangements and proportions of the various parts in such embodiments without departing from the spirit and scope of the invention as defined by the appended claims.

What is claimed is:

1. In a reference electrode having a salt bridge solution container of nonconductive material and an internal element, a liquid junction structure for the electrode comprising
   (a) a portion of said container, said portion having an opening therein;
   (b) a plurality of filaments, each filament having first and second ends;
   (c) said first ends of the filaments being joined together while said second ends of the filaments being loose; and
   (d) said filaments being partially disposed within the opening and confined therein with the joined first ends being within but spaced from the container whereby said filaments are adapted to allow the controlled passage of salt bridge solution through said container.

2. In a reference electrode as claimed in claim 1 wherein
   (a) the plurality of filaments comprise quartz yarn; and
   (b) the joined first ends are fused together.

3. In a reference electrode as claimed in claim 1 wherein
   (a) the plurality of filaments comprise quartz yarn; and
   (b) the first ends are joined by a hardened glass, said glass being applied in a molten condition to said first ends.

4. In a reference electrode as claimed in claim 1 wherein
   (a) the plurality of filaments comprise asbestos fibers; and
   (b) said joined first ends are joined together with a non-contaminating cement.

References Cited

UNITED STATES PATENTS 3,445,368   5/1969   Detemple _____ 204—195

TA-HSUNG TUNG, Primary Examiner